Figure 6:
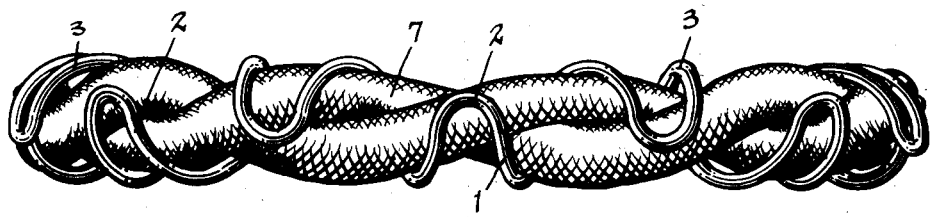

Feb. 3, 1931.  C. W. HUFF  1,790,666
LINE RETRIEVER
Filed April 29, 1929  2 Sheets-Sheet 1
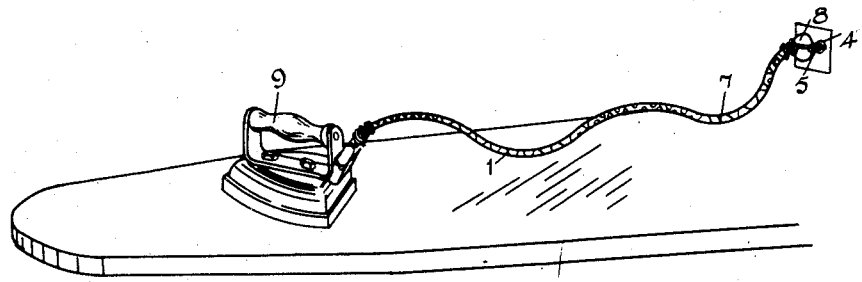
Fig 1
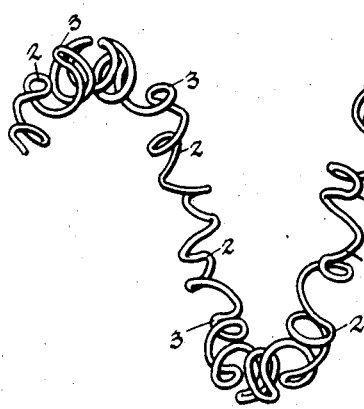
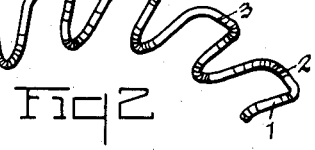
Fig 2
Fig 3
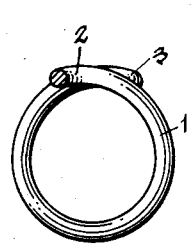
Fig 4
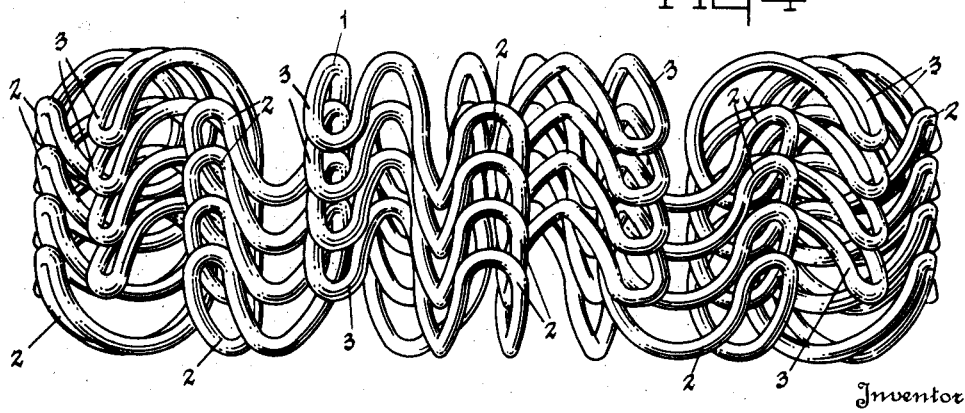
Fig 5
Inventor
Clayton W. Huff
By
Attorney Feb. 3, 1931. C. W. HUFF 1,790,666
LINE RETRIEVER
Filed April 29, 1929 2 Sheets-Sheet 2

Inventor
Clayton W. Huff
By Faust F. Crumpton
Attorney

Patented Feb. 3, 1931

1,790,666

UNITED STATES PATENT OFFICE

CLAYTON W. HUFF, OF TOLEDO, OHIO

LINE RETRIEVER

Application filed April 29, 1929. Serial No. 358,993.

My invention has for its object to provide an efficient retriever for lines that have parts that are continuously moved towards and away from a fixed point to which one end of the line is connected and wherein it is desired to eliminate slack or maintain the line yieldingly taut. The invention is particularly usable where one end of the line is connected to an instrument that is to be moved to and fro, with reference to a fixed point, and it is desired to provide for a take up for the line as the instrument is moved towards the fixed point.

The invention is particularly applicable to electrical appliances, such as electric soldering irons and flat irons that are electrically heated and telephones. It is usable for maintaining the electric wire or cord in a yielding elastic relation that causes it to elastically loop as it is released.

The invention particularly provides an elastic metal wire that is so shaped that it will maintain a spiral form of varied pitch according to the relative movement of portions of the line that it retrieves, the elastic wire being so formed that the line may be readily placed within its coils and being so shaped that its turns will not interloop or snarl.

The invention may be contained in spring wire retrievers that vary in their details of construction and, to illustrate a practical application of the invention, I have selected a wire retriever as an example of the various embodiments of my invention and shall describe it hereinafter. The retriever selected for purposes of illustration is shown in the accompanying drawing.

Fig. 1 is a perspective view of the retriever shown in connection with a flexible electric cord connected to a flat iron. Fig. 2 illustrates a side view of a part of one of the turns of the retriever. Fig. 3 illustrates a side view of the helix or spiral that the retriever maintains. Fig. 4 illustrates a cross section of the retriever. Fig. 5 illustrates the compactness of the closely placed turns of the retriever and indicates the coordination of the parts when the turns are permitted to freely arrange themselves by their inherent elasticity without intersnarling. Fig. 6 illustrates an edge view of one of the turns of the helix. The view is enlarged to conform substantially to the dimensions of Fig. 5.

In the retriever shown in the drawings, an elastic steel wire is bent to form a series of cylindrically formed loops. The portions of the wire being so formed that the cylindrical centers or axis of each loop lies within a helix having closely disposed turns, the cylindrically formed loops operating to form cylindrical parts that substantially enclose a cord or cable that may be located within the loops. The closed ends of the loops overlap with reference to a helical line that conforms to, and is located exterior to, the helical line that passes through the centers of the cylindrically formed loops whereby adjoining loops are spaced from each other and the ends of the overlapping portions of the loops are staggered relative to each other, the closed end of alternate loops extending in the same direction and in a direction opposite to that that the intermediate loops extend. Thus a line may be readily placed within the retriever from the outside of the helix of the retriever by merely holding the retriever so that its axis lies substantially at right angles to the line and winding the line on and directing it into the retriever, as on a spool, while portions of the line are bent back and forth in a direction parallel to the axis of the helix to pass the closed ends of the loops. The closed ends of the loops thus hold the line within the cage in which the retriever is thus formed. The line may also be readily removed from the retriever by merely pulling the line straight from the retriever as from a spool.

As shown in the figures, the spring wire 1 is provided with a plurality of cylindrically formed loops 2 that extend, for example, clockwise, and alternate loops 3 that extend counter-clockwise, and which are spaced apart but overlap or overextend a line drawn from tip to tip of the closed ends of either set of loops. The series of bent portions that form the succeeding loops are made in the form of a compact helix, that is, a helix that has closely disposed turns, with the result that the exteriormost parts of the bent wire lie within a surface that would substantially conform to the surface of a cylindrical rod having the radius of the loops and bent to form a helix having the same diameter as the helix of the bent wire. When, therefore, the spiral is expanded by axially lengthening the spiral, such expansion is yieldingly resisted by the elasticity of the spring. The spiral tends to return to its normal condition without intertwisting of the turns which otherwise produces snarling. The cylindrical formation of the loops keeps the wire from interhooking and forms a protective or spacing cage about the line.

Since the loops 2 and 3 have their closed ends located on the outside of the helix, a line may readily be placed within the retriever by merely winding the line on the helix as on a spool. The line may be bent back and forth to place it within the retriever and between the loops and so as to be enclosed by the loops, as the helix is rotated as a spool is rotated, while a line is fed to the spool. When it is desired to remove the line from the retriever, all that is necessary is merely to pull the line from the retriever which will cause the helix to rotate as a spool rotates when a thread or a line is drawn from a spool on which it is wound.

The end of the retriever may be provided with an eye 4 which may be connected to a hook or nail or screw, such as the pin 5, that may be located as, for example, in proximity to the plug, to which the electric cord 7, located within the retriever, is connected. The electric flexible cable 7 will thus be elastically supported within the retriever and without any twisting of the cable. As shown in the drawings, the flexible cord 7 is connected to a flat iron 9 which may be moved back and forth with respect to the plug 8 in the operation of the flat iron and the retriever will keep the flexible cord 7 out of the way as the flat iron is moved towards the plug. Thus the retriever may be used for retrieving electric cords of telephones and other electrical instruments.

Also, if desired, a bushing 10 may be inserted in a bent portion 11 of the end of the wire to prevent bending of the wire within the flexible cord 7 too sharply about the end loops of the retriever which might otherwise cause the breaking of the electric wire in continued use of the retriever.

I claim:

1. A line retriever, comprising an elastic wire bent to form a plurality of loops and to form a helix, the closed ends of the alternate loops overlapping the closed ends of the intermediate loops and the closed ends of the first named loops extending in the direction opposite to that of the second named loops, the said loops bent to conform to substantially cylindrical surfaces and adjoining loops located in spaced relation to each other.

2. A line retriever, comprising an elastic wire bent to form a plurality of loops and to form a helix, the closed ends of the alternate loops overlapping the closed ends of the intermediate loops and the closed ends of the first named loops extending in the direction opposite to that of the second named loops, the said loops located on the outside of the helix into which the wire is formed, and the said loops bent to conform to substantially cylindrical surfaces and adjoining loops located in spaced relation to each other.

3. A line retriever, comprising an elastic wire bent to form a plurality of loops and to form a helix, the closed ends of the alternate loops overlapping the closed ends of the intermediate loops and the closed ends of the first named loops extending in the direction opposite to that of the second named loops, the said loops bent to conform to substantially cylindrical surfaces and adjoining loops located in spaced relation to each other, the helix formed of turns having the same number of loops whereby the loops of the contiguous turns will automatically nest one within the other when one or the other ends of the helix is released.

In witness whereof I have hereunto signed my name to this specification.

CLAYTON W. HUFF.